United States Patent
Chenxi et al.

(10) Patent No.: US 11,651,269 B2
(45) Date of Patent: May 16, 2023

(54) METHOD, ELECTRONIC DEVICE AND COMPUTER PROGRAM PRODUCT FOR PROCESSING DATA

(71) Applicant: EMC IP Holding Company LLC, Hopkinton, MA (US)

(72) Inventors: Hu Chenxi, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 646 days.

(21) Appl. No.: 16/675,397

(22) Filed: Nov. 6, 2019

(65) Prior Publication Data
US 2021/0034922 A1 Feb. 4, 2021

(30) Foreign Application Priority Data
Aug. 2, 2019 (CN) .......................... 201910713771.8

(51) Int. Cl.
*G06F 16/00* (2019.01)
*G06N 20/00* (2019.01)
(Continued)

(52) U.S. Cl.
CPC ....... *G06K 9/6257* (2013.01); *G06F 16/2228* (2019.01); *G06F 16/2237* (2019.01);
(Continued)

(58) Field of Classification Search
CPC .......... G06N 20/00; G06N 20/20; G06N 5/04; G06F 16/2228; G06F 16/285;
(Continued)

(56) References Cited

U.S. PATENT DOCUMENTS 10,733,668 B2 * 8/2020 McKenna .............. G06N 20/20
11,164,109 B2 * 11/2021 Browne .............. G06F 16/2228
(Continued)

FOREIGN PATENT DOCUMENTS

WO WO2015153168 A1 * 10/2015
WO WO2017209988 A1 * 1/2016
(Continued)

OTHER PUBLICATIONS

Alexander Sergeev et al., "Horovod fast and easy distributed deep learning inTensorFlow", cs>LG Feb. 21, 2018, pp. 1-10.*
(Continued)

*Primary Examiner* — Srirama Channavajjala
(74) *Attorney, Agent, or Firm* — Ryan, Mason & Lewis, LLP

(57) ABSTRACT

A method comprises: generating, at a first computing device, a first set of gradient values associated with a data block processed by nodes of a machine learning model, the first set of gradient values being in a first data format; determining a first shared factor from the first set of gradient values, the first shared factor being in a second data format of a lower a precision than that of the first data format; and scaling the first set of gradient values with the first shared factor, to obtain a second set of gradient values having the second data format. In addition, the method comprises sending the second set of gradient values and the first shared factor to a second computing device; and, in response to receiving a third set of gradient values and a second shared factor from the second computing device, adjusting parameters of the machine learning model.

20 Claims, 10 Drawing Sheets

(51) Int. Cl.
  *G06K 9/62* (2022.01)
  *G06F 16/28* (2019.01)
  *G06F 16/22* (2019.01)
  *G06F 16/2455* (2019.01)
(52) U.S. Cl.
  CPC ...... *G06F 16/24565* (2019.01); *G06F 16/285* (2019.01); *G06F 16/288* (2019.01); *G06K 9/6231* (2013.01); *G06K 9/6265* (2013.01); *G06N 20/00* (2019.01)
(58) Field of Classification Search
  CPC ........... G06F 16/2237; G06F 16/24565; G06F 16/288; G06F 16/289; G06F 16/3346; G06F 16/3347; G06K 9/6257; G06K 9/6265; H04L 41/16; H04L 41/20; H04L 41/40
  See application file for complete search history.

(56) References Cited

U.S. PATENT DOCUMENTS

| | | | | |
|---|---|---|---|---|
| 11,210,586 | B1* | 12/2021 | Duong | G06N 3/063 |
| 11,328,222 | B1* | 5/2022 | Matthews | H04L 49/3027 |
| 2014/0040279 | A1* | 2/2014 | Beygelzimer | H04L 63/1408 |
| | | | | 707/736 |
| 2015/0113133 | A1* | 4/2015 | Srinivas | H04L 41/0895 |
| | | | | 709/224 |
| 2016/0057054 | A1* | 2/2016 | Lumezanu | H04L 45/14 |
| | | | | 370/256 |
| 2017/0032222 | A1* | 2/2017 | Sharma | G06K 9/6232 |
| 2018/0068083 | A1* | 3/2018 | Cohen | G16B 40/20 |
| 2018/0336464 | A1* | 11/2018 | Karras | G06K 9/6274 |
| 2020/0042895 | A1* | 2/2020 | Mclaren | G06N 20/00 |
| 2020/0067851 | A1* | 2/2020 | Yigit | H04L 45/306 |
| 2020/0143005 | A1* | 5/2020 | Nair | G06F 16/285 |
| 2020/0175320 | A1* | 6/2020 | Panging | G06N 20/00 |
| 2020/0175370 | A1* | 6/2020 | Zhang | G06N 3/082 |
| 2020/0242466 | A1* | 7/2020 | Mohassel | H04L 9/008 |
| 2020/0265301 | A1* | 8/2020 | Burger | G06N 5/04 |
| 2020/0302234 | A1* | 9/2020 | Walters | G06N 7/005 |
| 2022/0230062 | A1* | 7/2022 | Larsson | G06N 3/0445 |

FOREIGN PATENT DOCUMENTS

| | | | |
|---|---|---|---|
| WO | WO2017034820 | A1 * | 3/2017 |
| WO | WO2017209988 | A1 * | 12/2017 |
| WO | WO2019103999 | A1 * | 5/2019 |
| WO | WO2020055580 | A1 * | 3/2020 |

OTHER PUBLICATIONS

Abhishek Sinha et al., "Towards Mathematical Reasoning a Multimodal Deep Learning Approach", 25th IEEE International Conference on Image Processing (ICIP), Oct. 2018, pp. 4028-4032.*

Ahyoung Kim et al., "Data Analyst Platform Using Open Source Based Deep Learning Engine", 2018 International Conference on Platform Technology and Service (PlatCon), Jan. 2018, pp. 1-5.* barefootnetworks.com, "Benefits," barefootnetworks.com/products/brief-tofino/, 2019, 2 pages.

Wikipedia, "P4 (Programming Language)," https://en.wikipedia.org/wiki/P4_(programming_language), Oct. 16, 2019, 4 pages.

X. Jin et al., "NetCache: Balancing Key-Value Stores with Fast In-Network Caching," Proceedings of the 26th Symposium on Operating Systems Principles (SOSP), Oct. 28, 2017, pp. 121-136.

* cited by examiner

METHOD, ELECTRONIC DEVICE AND COMPUTER PROGRAM PRODUCT FOR PROCESSING DATA

RELATED APPLICATION(S)

The present application claims priority to Chinese Patent Application No. 201910713771.8, filed Aug. 2, 2019, and entitled "Method, Electronic Device and Computer Program Product for Processing Data," which is incorporated by reference herein in its entirety.

FIELD

Embodiments of the present disclosure generally relate to the field of data processing, and more specifically, to a method, electronic device and computer program product for processing data in a machine learning model.

BACKGROUND

Currently, with the development of computer technology, more and more tasks are processed through machine learning models. In a machine learning model, the model is typically trained first with sample data. In the process of training the machine learning model with sample data, parameters of the machine learning model are adjusted to converge the training results of the machine learning model. Then, the trained model is used to process data.

However, with the growth of machine learning models, machine learning models can be deployed onto different devices to execute data parallelism or model parallelism. Deep learning models become more complex with a large number of parameters. Distributed deep learning can shorten model training time. With the expansion of the scale of graphics processing unit (GPU) cluster, parallel computing of a distributed GPU can achieve a higher training speed. However, there are still many problems in the process of executing a machine learning model in parallel.

SUMMARY

Embodiments of the present disclosure provide a method, device, and computer program product for processing data.

In accordance with a first aspect of the present disclosure, there is provided a method of processing data. The method comprises generating, at a first computing device, a first set of gradient values associated with a data block processed by nodes of a machine learning model, the first set of gradient values being in a first data format. The method also comprises determining a first shared factor from the first set of gradient values, the first shared factor being in a second data format of a lower precision than that of the first data format. The method further comprises scaling the first set of gradient values with the first shared factor, to obtain a second set of gradient values having the second data format. In addition, the method comprises sending the second set of gradient values and the first shared factor to a second computing device. Moreover, the method comprises, in response to receiving a third set of gradient values and a second shared factor from a second computing device, adjusting parameters of the machine learning model.

In accordance with a second aspect of the present disclosure, there is provided a method of processing data. The method comprises receiving, at a second computing device, a second set of gradient values and a first shared factor from a first computing device, the second set of gradient values being obtained by scaling a first set of gradient values with the first shared factor, the first set of gradient values being associated with a data block processed by nodes of the machine learning model. The method also comprises obtaining a fourth set of gradient values of a third device for the data block and a third shared factor related to the fourth set of gradient values, the machine learning model being run by the third device. The method further comprises determining a third set of gradient values and a second shared factor for the third set of gradient values, based on the first shared factor, the second set of gradient values, the fourth set of gradient values and the third shared factor. In addition, the method comprises sending, to the first computing device, the third set of gradient values and the second shared factor for adjusting parameters of the machine learning model by the first computing device.

In accordance with a third aspect of the present disclosure, there is provided an electronic device. The electronic device comprises a processor and a memory storing computer program instructions, the processor running the computer program instructions in the memory to control the electronic device to execute acts of: generating a first set of gradient values associated with a data block processed by nodes of a machine learning model, the first set of gradient values being in a first data format; determining a first shared factor from the first set of gradient values, the first shared factor being in a second data format with a lower precision than that of the first data format; scaling the first set of gradient values with the first shared factor, to obtain a second set of gradient values having the second data format; sending the second set of gradient values and the first shared factor to a second computing device; and in response to receiving a third set of gradient values and a second shared factor from a second computing device, adjusting parameters of the machine learning model.

In accordance with a fourth aspect of the present disclosure, there is provided an electronic device. The electronic device comprises a processor; and a memory storing computer program instructions, the processor running the computer program instructions in the memory to control the electronic device to execute acts of: receiving a second set of gradient values and a first shared factor from a first computing device, the second set of gradient values being obtained by scaling a first set of gradient values with the first shared factor, the first set of gradient values being associated with a data block processed by nodes of the machine learning model; obtaining a fourth set of gradient values of a third device for the data block and a third shared factor related to the fourth set of gradient values, the third device running the machine learning model; determining a third set of gradient values and a second shared factor for the third set of gradient values, based on the first shared factor, the second set of gradient values, the fourth set of gradient values and the third shared factor; and sending, to the first computing device, the third set of gradient values and the second shared factor for adjusting parameters of the machine learning model by the first computing device.

In accordance with a fifth aspect of the present disclosure, there is provided a computer program product. The computer program product is tangibly stored on a non-volatile computer readable medium, and includes machine-executable instructions which cause, when executed, a machine to perform steps of the method in the first aspect of the present disclosure.

In accordance with a sixth aspect of the present disclosure, there is provided a computer program product. The computer program product is tangibly stored on a non-volatile computer readable medium, and includes machine-executable instructions which cause, when executed, a machine to perform steps of the method in the second aspect of the present disclosure.

Through the method, the solution can reduce the amount of data transmission and improve network model computing efficiency.

BRIEF DESCRIPTION OF THE DRAWINGS

The above and other objectives, features and advantages of the present disclosure will become more apparent, through the following detailed description of the exemplary embodiments of the present disclosure with reference to the accompanying drawings, in which the same reference symbols generally refer to the same parts.

Throughout the drawings, the same or similar symbols refer to the same or corresponding parts.

DETAILED DESCRIPTION

Figure 1:
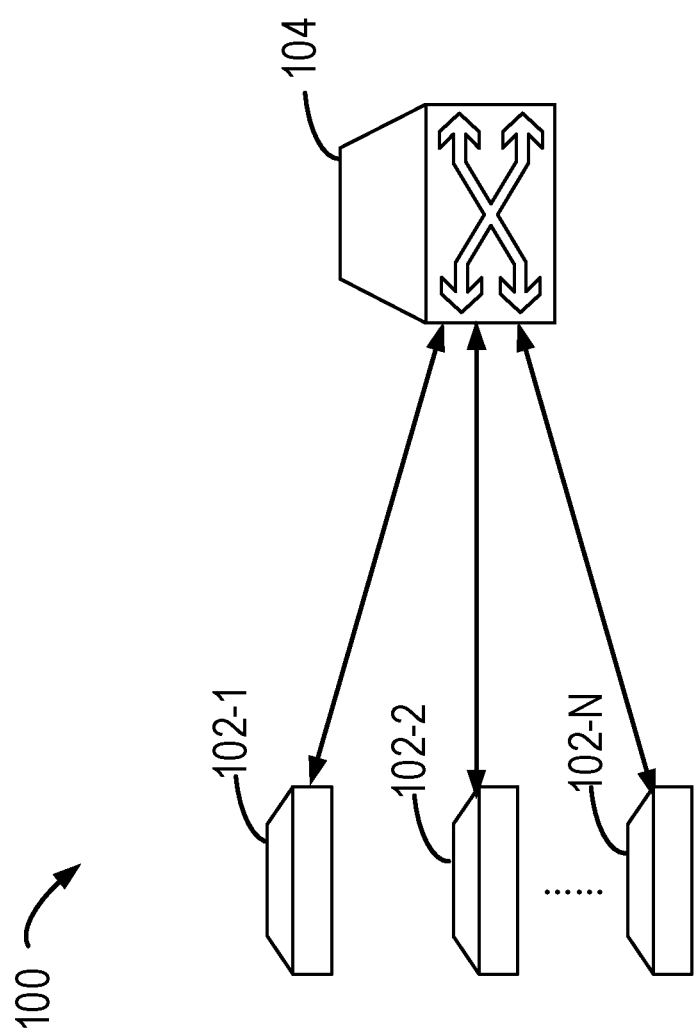
FIG. 1 illustrates a schematic diagram of an example environment in which a device and/or method according to embodiments of the present disclosure can be implemented.

Embodiments of the present disclosure will now be described in detail with reference to the accompanying drawings. Although the drawings illustrate certain embodiments of the present disclosure, it is to be appreciated that the present disclosure may be implemented in various manners and cannot be construed as being limited by the embodiments set forth herein. Rather, these embodiments are provided for understanding the present disclosure more thoroughly and completely. It is to be appreciated that the drawings and embodiments are provided merely for illustration, without any intention of limiting the protection scope of the present disclosure.

In the description of the embodiments of the present disclosure, the term "includes" and its variants are to be read as open-ended inclusion that mean "includes, but is not limited to." The term "based on" is to be read as "based at least in part on." The term "one embodiment" or "the embodiment" is to be read as "at least one embodiment." The terms "first," "second," and the like may refer to different or same objects. Other definitions, either explicit or implicit, may be included hereinafter.

Principles of the present disclosure will be described below with reference to several example embodiments as shown in the accompanying drawings. Although the drawings illustrate preferred embodiments of the present disclosure, it would be appreciated that these embodiments are provided merely to help those skilled in the art better understand and further carry out the present disclosure, rather than limiting the scope of the present disclosure in any manner.

When a machine learning model is deployed on different computing nodes, communication among computing nodes (for example, GPUs) is one of the most challenging issues when training distributed deep learning models in a large-scale environment. By exchanging gradient values among the computing nodes, parameters of all training processes may be synchronized. However, the latency of gradient values exchanging over all computing nodes is the bottleneck of distributed deep learning.

In a traditional solution, training a deep learning model in a cluster of distributed computing nodes requires exchanging gradients among the computing nodes after every step of training. The algorithms for parameter synchronization are dependent on computing nodes (for example, GPU or central processing unit (CPU)). By accumulation of the gradient values of different computing nodes, the algorithms can achieve the result of parameter synchronization. This means that there is a need for transmitting a lot of data among the computing nodes. The most popular algorithm for parameter synchronization is AllReduce and some methods derived from the AllReduce algorithm.

In the AllReduce algorithm, if data in each computing node are N and the number of computing nodes is P, the total amount of data transmission is $T=N*(P-1)*P$. Transmission includes sending and receiving, and it is likely that sending and receiving involve the same amount. In the Ring-AllReduce algorithm, the total amount of data transmission required in each process is $T=2N*(P-1)$. Since the data are typically 32-bit floating point data, the amount of data transmitted in the transmission is too great, thus impacting processing of the machine learning model.

In order to solve at least the above problem, the present disclosure provides a method of processing data. Gradient values computed at a computing device are transmitted to a switch, and then the gradient values are accumulated via the switch. Since the data are converted from a high precision format into a low precision format prior to data transmission, the amount of data to be transmitted can be reduced by sending the data in the low precision format to the switch. In addition, the accuracy can be ensured, for the transmitted data include a shared exponent of gradient values. The above method can significantly reduce the network traffic latency and greatly accelerate the exchange or synchronization of gradients among a plurality of computing devices.

FIG. 1 illustrates a schematic diagram of an example environment 100 in which a device and/or method according to embodiments of the present disclosure can be implemented.

The example environment 100 includes therein a plurality of computing devices 102-1, 102-2 . . . 102-N for running different instances of the same machine learning model (N is a positive integer), which are collectively referred to as computing device 102, for ease of description.

In some embodiments, the computing device 102 may be any device capable of running instances of a machine learning model, which may be implemented by software or hardware. The example computing device 102 includes, but is not limited to, a personal computer, server computer, handheld or laptop device, mobile device (such as, mobile phone, Personal Digital Assistance (PDA), media player, and the like), multi-processor system, consumer electronic product, small-scale computer, large-scale computer, distributed computing environment including any one of the above system or device, or the like.

When processing a data block, the machine learning model running in the computing device 102 generates gradient values for nodes of the machine learning model. For example, the gradient values are determined by means of a loss function.

In some embodiments, the computing device 102 may be a dedicated processing device for running a machine learning model, such as a field-programmable gate array (FPGA) device, a GPU device, and the like. A plurality of different dedicated processing devices are distributed over the network.

In some embodiments, the computing device 102 may be a virtual machine for running the machine learning model. A plurality of virtual machines may be distributed onto the same device or different devices.

The computing device 102 is provided for running a machine learning model. When a machine learning model is employed by the computing device 102 to process data blocks, a set of gradient values will be generated. The gradient value indicates a gradient between two nodes of the machine learning model.

In some embodiments, the computing device 102 first converts the gradient values in a high precision format into data in a low precision format using a shared exponent. For example, the gradient values are converted from 32-bit floating point data into 16-bit integer. During conversion, the exponent value shared by the gradient values is determined, and then a scaling factor is determined using the shared exponent value to scale the gradient values. After the processing has been completed, the computing device 102 sends the shared exponent value and the gradient values to a computing device 104 (as shown in FIG. 1) for accumulation processing. Thereafter, the accumulation-processed gradient values and the shared exponent for the accumulation-processed gradient value are obtained from the computing device 104. The accumulated gradient values are adjusted by the shared exponent and converted into a high precision format. Then, parameters of the machine learning model are adjusted using the converted gradient values.

In some embodiments, when converting data, the computing device 102 is required not only to determine the exponent value shared by the gradient values, but also to determine the shared bias value. All gradient values are converted into positive numbers via the shared bias value. Then, the gradient values are scaled using the shared exponent value and converted into a low precision format. The exponent part of the shared bias value is determined, and then the bias value is adjusted using the exponent value and converted into a low precision format. Next, the computing device 102 sends the shared exponent value, the scaled gradient values, the shared bias value, and the exponent value for the shared bias value to the computing device 104 for accumulation processing. The accumulation-processed gradient values, the shared exponent for the accumulation-processed gradient values, the new bias values, and the exponent for the new bias values are then obtained from the computing device 104. The foregoing data received are processed to determine accumulated gradient values, and parameters of the machine learning model then are adjusted using the accumulated gradient values.

The above example is provided only for describing the present disclosure, rather than suggesting any specific limitation thereto. Those skilled in the art may convert the gradient values in any appropriate manner, as required.

As mentioned above, the example computing environment 100 further includes a computing device 104. The computing device 104 is provided for processing data from the computing device 102. In some embodiments, the computing device 104 is provided for processing gradient values related to the machine learning model from the computing device 102.

In some embodiments, the computing device 104 is a programmable switch, which is connected to the computing device 102 via a network, and exchange data with the computing device 102 via a network protocol.

In some embodiments, the computing device 104 may be any appropriate computing device that can implement processing of gradient values from the computing device 102. The example computing device includes, but is not limited to, a personal computer, server computer, handheld or laptop device, mobile device (for example, mobile phone, Personal Digital Assistance (PDA), media player, and the like), multi-processor system, consumer electronic product, small-scale computer, large-scale computer, distributed computing environment including any one of the above system or device, or the like.

In some embodiments, the computing device 104 receives the shared exponent and the adjusted bias value from the computing device 102. The computing device 104 determines, based on an identification of a data block, a historical accumulated gradient value for the data block and a shared exponent value therefor stored in the computing device 104. The computing device 104 processes the received gradient values and the historical accumulated gradient value using the received shared exponent and the stored shared exponent, to obtain the current accumulated gradient value. Alternatively or in addition, only after receiving the gradient values related to the machine learning model computed by all the computing devices, the computing device 104 broadcasts the accumulated gradient value to the respective computing devices.

In some embodiments, according to the network protocol, a data packet transmitted between the computing device 102 and the computing device 104 may be configured to include 65535 bytes to increase the amount of data transmission.

In some embodiments, the computing device 104 is a programmable switch. At most 523776 bits are stored once at the computing device 104, and then the data are processed together in a predetermined manner, to improve the data processing efficiency.

Figure 2:
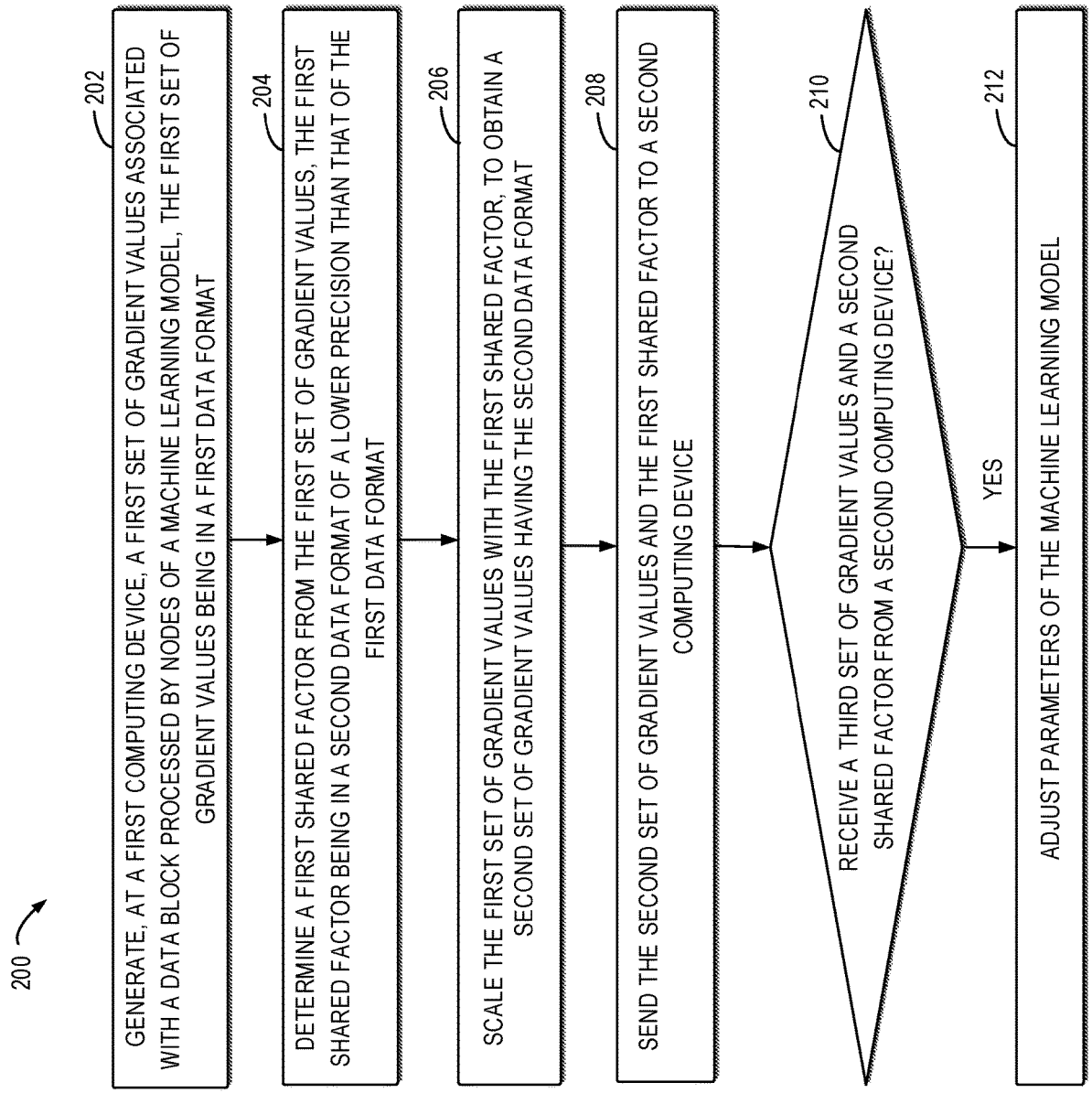
FIG. 2 illustrates a flowchart of a process for processing data according to embodiments of the present disclosure.

FIG. 1 as discussed above illustrates a schematic diagram of the example environment 100 in which a device and/or method according to embodiments of the present disclosure can be implemented. Hereinafter, reference will be made to FIG. 2 to describe below in detail the process 200 for processing data according to embodiments of the present disclosure.

At block 202, the computing device 102 generates a first set of gradient values associated with a data block processed by nodes of the machine learning model, which is in first data format. After processing the allocated data block using the machine learning model, the computing device 102 generates gradient values related to the nodes of the machine learning model. Alternatively or in addition, the machine learning model is a neural network model.

In some embodiments, when the machine learning model is processing the data block, the first set of gradient values of the neural network is computed through the following formula:

$$g_r^{(t)} = \Sigma_{k=1}^{n_r} \partial l(x_{i_k}, y_{i_k}, w_r^{(t)}) \tag{1}$$

where $g_r^{(t)}$ represents a sum of gradient changes of a $r^{th}$ computing device at time instant t, $\partial l(x_{i_k}, y_{i_k}, w_r^{(t)})$ represents a loss function, $n_r$ represents a total amount of data in the data block being processed, k represents each of the data in the data block, $x_{i_k}$ represents input data of each layer, $y_{i_k}$ represents output data of each layer, i represents a number of layers in the neural network, and $w_r^{(t)}$ represents a parameter value of the $r^{th}$ computing device at time instant t, with the machine learning model running on the $r^{th}$ computing device. The above example is provided merely for describing the present disclosure, without suggesting any specific limitation thereto.

Those skilled in the art may determine gradient values of a machine learning model in any appropriate manner.

In some embodiments, in order to ensure accuracy of data, the computed gradient values are confined within a predetermined range, thereby preventing the gradient values with large deviations from impacting the machine learning model. If there is a gradient value in the first set of gradient values that is greater than a first threshold, it is set as the first threshold. If there is a gradient value in the first set of gradient values that is less than a second threshold, it is set as the second threshold which is less than the first threshold.

In some embodiments, in order to ensure accuracy of cloud computing data, the data in the computed gradient values are defined. If $g_r^{(t)} > K$, $g_r^{(t)} = K$; and if $g_r^{(t)} < -K$, $g_r^{(t)} = -K$, where K is a preset value. In this way, the computed gradient values may be confined within a predetermined range.

At block 204, the first computing device 102 determines from the first set of gradient values a first shared factor being in a second data format of a lower precision than that of the first data format. In order to reduce the amount of data to be transmitted to the computing device 104, the computing device 102 first determines the shared exponent for all of the gradient values, and then scales the gradient values using a scaling factor formed with the shared exponent.

Subsequent to obtaining the first set of gradient values, the computing device 102 determines a maximum value and a minimum value in the first set of gradient values. The first shared factor is then determined based on the maximum gradient value and the minimum gradient value.

The computing device 102 may compute the maximum gradient value from the set of gradient values through the following formula (2):

$$g\_max_r^{(t)} = \max\{g_r^{(t)}\} \tag{2}$$

where $g\_max_r^{(t)}$ represents the maximum gradient value from all of the gradient values in the $r^{th}$ computing device at time instant t.

The computing device 102 may further compute the minimum gradient value through the following formula (3):

$$g\_min_r^{(t)} = \min\{g_r^{(t)}\} \tag{3}$$

where $g\_min_r^{(t)}$ represents the minimum gradient value from all of the gradient values in the $r^{th}$ computing device at time instant t.

Following determining the maximum gradient value and the minimum gradient value, the computing device 102 can determine a shared exponent (also referred to as a first shared factor) of the gradient values using the maximum and minimum gradient values.

In some embodiments, the computing device 102 may compute the shared exponent (i.e. the first shared factor) through the following formula (4):

$$\exp_r^{(t)} = \log_2(1/(g\_max_r^{(t)} - g\_min_r^{(t)})) \tag{4}$$

where $\exp_r^{(t)}$ represents the shared exponent of all the gradient values of the $r^{th}$ computing device at time instant t.

At block 206, the first computing device 102 scales the first set of gradient values with the first shared factor, to obtain a second set of gradient values having the second data format. After determining the first shared factor, the first computing device 102 obtains the scaling factor of the first set of gradient values through the first shared factor.

In order to scale the first set of gradient values, the computing device 102 needs to generate the scaling factor for the first set of gradient values using the first shared factor through the following formula (5):

$$E_{g_r}^{(t)} = \frac{\left(\text{MAX}_{INT16} * \left(2^{\exp_r^{(t)}}\right)\right)}{\text{size}} \tag{5}$$

where $E_{g_r}^{(t)}$ represents a multiple that all the gradient values of the $r^{th}$ computing device are required to be amplified at time instant t, size represents a total number of computing devices or processing nodes, $\text{MAX}_{INT16}$ represents a maximum value that can be formed in the 16-bit integer. Subsequently, the computing device 102 adjusts the first set of gradient values through the following formula (6):

$$g_r^{(t)''} = \text{int}(g_r^{(t)} * E_{g_r}^{(t)}) \tag{6}$$

where $g_r^{(t)''}$ represents all of the amplified gradient values of the $r^{th}$ computing device or processing node at time instant t, i.e., the second set of gradient values formed.

Figure 3:
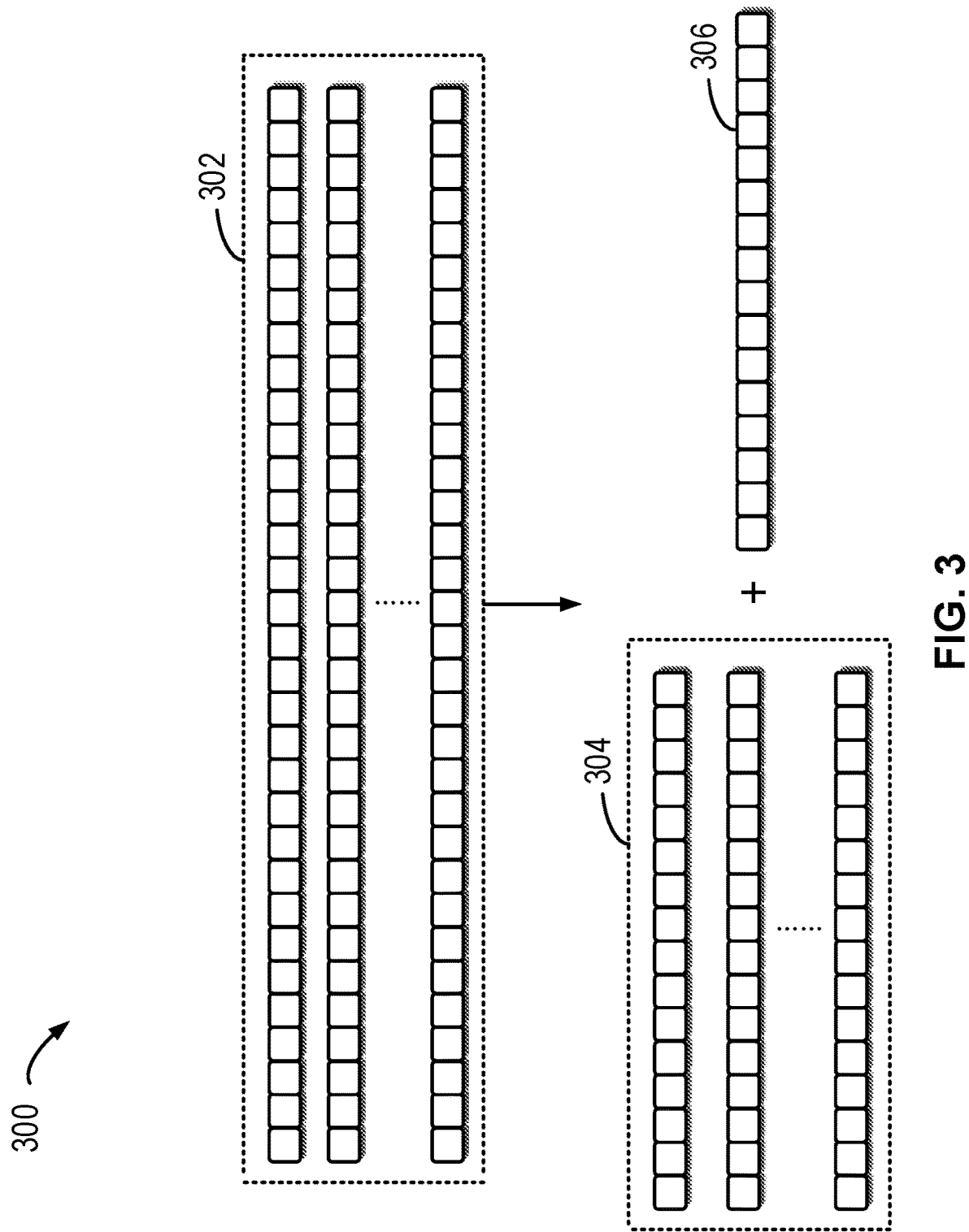
FIG. 3 illustrates a schematic diagram of an example for converting a data format of gradient values according to embodiments of the present disclosure.

As shown in FIG. 3, through the above operation, the computing device 102 can convert the first set of gradient values 302 represented in a 32-bit floating point number into the second set of gradients 304 represented in a 16-bit integer and the shared exponent 306.

At block 208, the computing device 102 sends the second set of gradient values and the first shared factor to the second computing device. After computing through the above formula, the computing device 102 sends the obtained $g_r^{(t)''}$ and $\exp_r^{(t)}$ to the computing device 104. At block 210, the computing device 102 determines whether a third set of gradient values and a second shared factor have been received from the second computing device. If the third set of gradient values and the second shared factor have been received, parameters of the machine learning model are adjusted at block 212. The process of adjusting the machine learning model will be described below in detail.

Through the above method, the data to be transmitted is reduced, significantly decreasing the network traffic and latency, and greatly speeding up the exchange or synchronization of gradients among a plurality of computing devices. Since the data transmission includes transmission of a public shared exponent, accuracy is guaranteed.

The solution in which a first set of gradient values having a first data format are converted into a second set of gradient values having a second data format and a first shared factor have been described above. The above solution can be further optimized by setting a bias.

After generating the first set of gradient values and the first shared factor, as described above, the computing device 102 determines, based further on the minimum value in the first set of gradient values, a shared bias value related to the first set of gradient values which is also referred to as first bias value, for ease of description. The first bias value has a first data format. The first bias value may be obtained through the following formula (7):

$$bias_r^{(t)} = -g\_min_r^{(t)} \quad (7)$$

where $bias_r^{(t)}$ represents the bias value of all gradients of the $r^{th}$ instance at time instant t. Therefore, when scaling the first set of gradient values using the first shared factor, the first set of gradient values are first adjusted using the first bias value. The adjusting process may be implemented through the following formula (8):

$$g_r^{(t)'} = g_r^{(t)} + bias_r^{(t)} \quad (8)$$

where $g_r^{(t)'}$ represents all of the bias-adjusted gradient values of the $r^{th}$ computing device at time instant t.

The computing device 102 scales the first set of gradient values adjusted, using the first shared factor, to generate a second set of gradient values.

At this time, scaling the gradient values may be performed through the following formula (9):

$$g_r^{(t)''} = int(g_r^{(t)'} * E_{g_r}^{(t)}) \quad (9)$$

where $g_r^{(t)''}$ represents all of the amplified gradients of the $r^{th}$ computing device or processing node at time instant t.

Since the first set of gradient values are processed using the first bias value, the computing node 102 also needs to process the first bias value and transmit the same to the computing device 104.

First, the computing device 102 determines, based on the first bias value, a first bias value factor having the second data format. Wherein, the computing device 102 may determine the first bias value factor through the following formula:

$$bias\_exp_r^{(t)} = \log_2(1/fabs(bias_r^{(t)})) \quad (10)$$

where $bias\_exp_r^{(t)}$ represents an exponent part of the shared bias value of the $r^{th}$ computing device at time instant t.

Next, a scaling factor of the first bias value is determined through the first bias value factor. The scaling factor is determined through the following formula (11):

$$E_{bias_r}^{(t)} = \frac{\left(MAX_{INT16} * \left(2^{bias\_exp_r^{(t)}}\right)\right)}{size} \quad (11)$$

where $E_{bias_r}^{(t)}$ represents an amplified multiple of a shared bias value of the $r^{th}$ computing device at time instant t, and size represents a total number of computing devices or processing nodes.

Thereafter, based on the first bias value factor, the computing device 102 scales the first bias value, to obtain a second bias value represented in the second data format. Typically, the computing device 102 obtains the second bias value through the following formula (12):

$$bias\_factor_r^{(t)} = int(bias_r^{(t)} * E_{bias_r}^{(t)}) \quad (12)$$

where $bias\_factor_r^{(t)}$ represents an integer value obtained by amplifying the decimal part of the shared bias value of the $r^{th}$ computing device at time instant t, which is also referred to as the second bias value.

Figure 4:
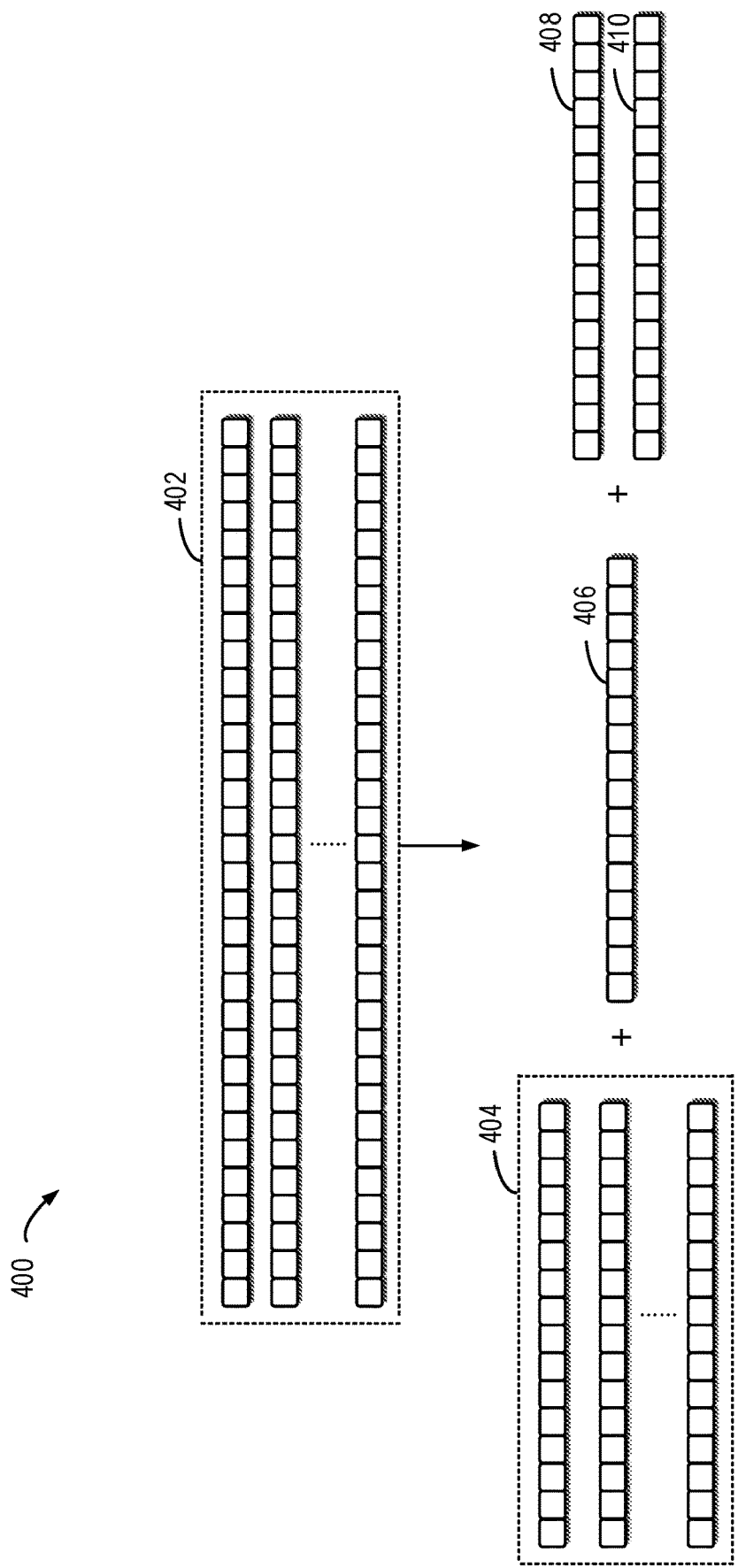
FIG. 4 illustrates a schematic diagram of an example for converting a data format of gradient values according to embodiments of the present disclosure.

As shown in FIG. 4, the set of gradient values 402 in the first data format is converted into the set of gradient values 404 in the second data format, the shared exponent 406, the decimal part 408 of the shared bias value, and a shared bias value exponent 410.

The computing device 102 sends the second bias value and the first bias value factor to the second computing device 104. In some embodiments, the second set of gradient values, the first shared factor, the second bias value and the first bias value factor (for example, $g_r^{(t)''}$, $exp_r^{(t)}$, $bias\_exp_r^{(t)}$, $bias\_factor_r^{(t)}$) are sent together to the computing device 104.

Then, the computing device 102 receives from the second computing device 104 a third bias value and a second bias value factor, for adjusting the third set of gradient values. In some embodiments, the third bias value and the second bias value factor are received, together with the third set of gradient values and the second shared factor.

Since the gradient values are further converted using a bias value, the method not only guarantees reducing the amount of data to be transmitted, but also improves the precision of gradient values to be transmitted.

The method for processing data according to embodiments of the present disclosure has been described above with reference to FIGS. 2-4. Hereinafter, reference will be made to FIG. 5 to discuss in detail a flowchart of a process 500 for processing data at the computing device 104 side.

At block 502, the second computing device 104 receives the second set of gradient values and the first shared factor from the first computing device 102, where the second set of gradient values are obtained by scaling the first set of gradient values associated with the data block being processed by the nodes of the machine learning model using the first shared factor. As described above, the computing device 104 receives $g_r^{(t)''}$ and $exp_r^{(t)}$ from the computing device 102.

At the computing device 104, an identification of a job related to the machine learning model, identifications of devices running the machine learning model, and an identification of the data block being processed are received from the first computing device 102, together with the second set of gradient values and the first shared factor.

At block 504, the second computing device 104 obtains a fourth set of gradient values of a third device directed to the data block and a third shared factor related to the fourth set of gradient values, with the machine learning model being running by the third device. The second computing device 104 also receives gradient values in computing devices running the same machine learning model instance. The second computing device may accumulate, based on the identification of the data block being processed, the gradient values from one or more third devices to form a fourth set of gradient values having been stored in the second computing device 104, and the second computing device 101 also stores the third shared factor corresponding to the fourth set of gradient values.

At block 506, the second computing device 104 determines a third set of gradient values and a second shared factor for the third set of gradient values, based on the first shared factor, the second set of gradient values, the fourth set of gradient values and the third shared factor. After obtaining the first shared factor, the second set of gradient values, the fourth set of gradient values and the third shared factor, the second computing device 104 may generate, using the data, a current accumulated gradient value including the second set of gradient values, and a shared factor for the accumulated gradient value. The process of determining the third set of gradient values and the second shared factor for the third set of gradient values at block 506 will be described in detail in the following part.

At block 508, the second computing device 104 sends, to the first computing device 102, the third set of gradient values and the second shared factor, for adjusting parameters of the machine learning model by the first computing device.

Through the above method, the second computing device 104 is used to process the data for gradient values, thereby reducing the amount of data transmitted among the computing devices running the machine learning model. Since the data scaled with a shared factor are processed at the second computing device, the amount of data to be processed is reduced and the data processing efficiency is improved.

Figure 5:
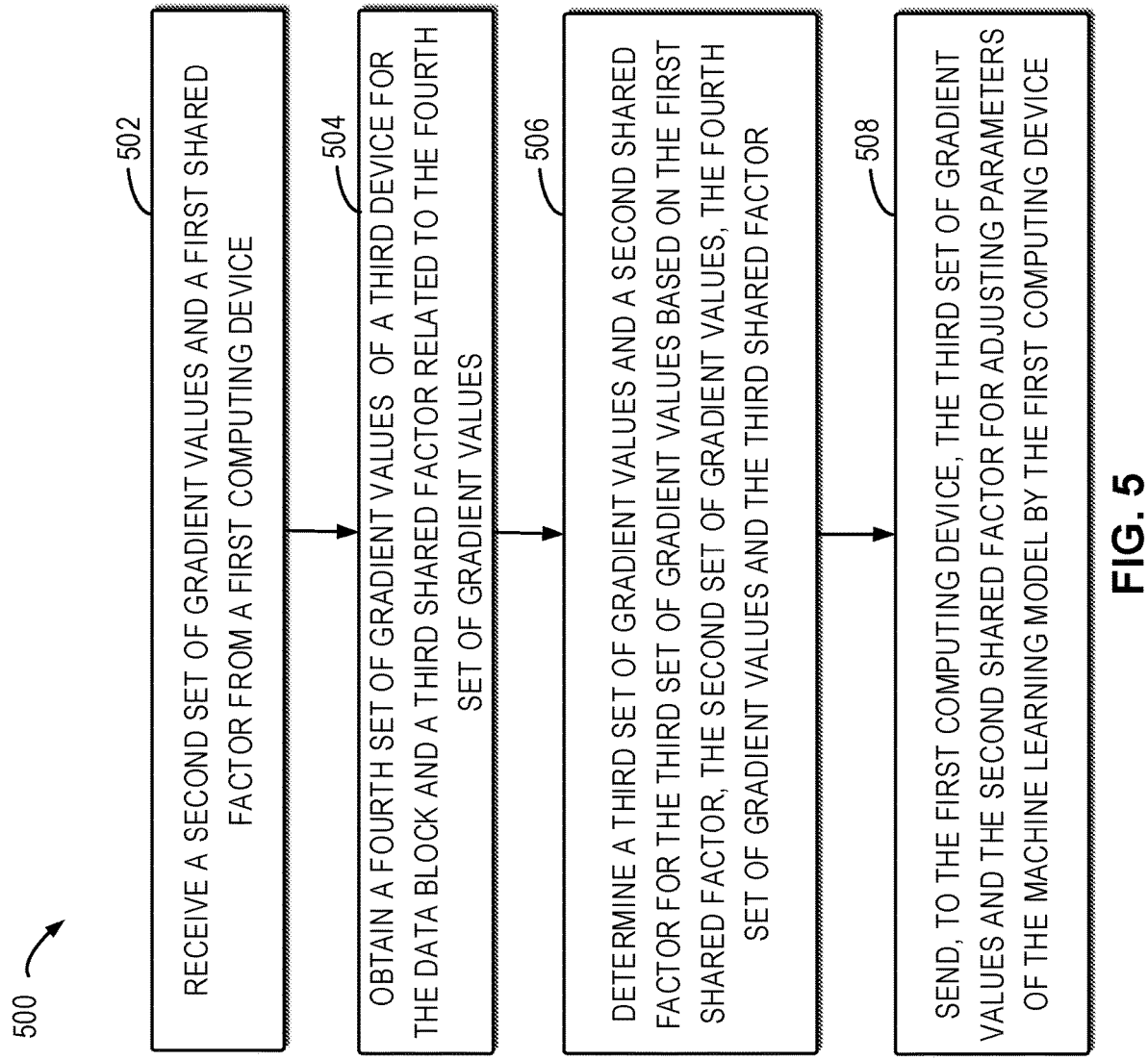
FIG. 5 illustrates a flowchart of a process for processing data according to embodiments of the present disclosure.

The process for determining, at block 506, the third set of gradient values and the second shared factor for the third set of gradient values in FIG. 5, as mentioned above, will be described below in detail.

In some embodiments, the computing device 104 determines a first difference between the third shared factor and the first shared factor. The computing device 104 determines the first difference though the following formula (13):

$$\Delta \exp^{(t)} = \exp_0^{(t)} - \exp_r^{(t)} \quad (13)$$

where $\exp_0^{(t)}$ represents a shared exponent value of the current accumulated value at time instant t, i.e., the third shared factor. $\exp_r^{(t)}$ represents a shared exponent value of gradient values of the $r^{th}$ computing device at time instant t, i.e., the first shared factor. $\Delta \exp^{(t)}$ represents a difference between the shared exponent value of the gradients of the $r^{th}$ computing device at time instant t and the shared exponent value of the current accumulated value, i.e., the first difference.

Subsequently, the computing device 104 determines whether the first difference is greater than or equal to a third threshold. In one example, the third threshold is 0.

If the first difference is greater than or equal to the third threshold, the computing device 104 uses the first shared factor as a second shared factor. That is, if $\Delta \exp^{(t)} \geq 0$, $\exp_0^{(t)} = \exp_r^{(t)}$.

The computing device 104 adjusts the fourth set of gradient values based on the first difference, and then determines the third set of gradient values based on the second set of gradient values and the fourth set of gradient values.

Determining the third set of gradient values is performed through the following formula (14):

$$g_{0_{(r)}}^{(t)\prime\prime} = \frac{g_{0_{(r-1)}}^{(t)\prime\prime}}{2^{\Delta \exp^{(t)}}} + g_r^{(t)\prime\prime} \quad (14)$$

where $g_{0_{(r-1)}}^{(t)\prime\prime}$ represents an accumulated value of gradient values of the preceding (r−1) computing devices at time instant t, and $g_{0_{(r)}}^{(t)\prime\prime}$ represents an accumulated value of integers of gradient values of the r computing devices at time instant t.

If the first difference is less than the third threshold, the computing device 104 uses the third shared factor as the second shared factor, and then adjusts the second set of gradient values based on the first difference; and determines the third set of gradient values based on the adjusted second set of gradient values and the fourth set of gradient values.

In some embodiments, if the first difference is less than the third threshold, it indicates that there is no need for adjusting the shared factors stored in the computing device 104. Next, the computing device 104 determines the third set of gradients through the following formula (15):

$$g_{0_{(r)}}^{(t)\prime\prime} = g_{0_{(r-1)}}^{(t)\prime\prime} + g_r^{(t)\prime\prime} * 2^{\Delta \exp^{(t)}} \quad (15)$$

where $g_{0_{(r-1)}}^{(t)\prime\prime}$ represents an accumulated value of amplified gradient values of the preceding (r−1) computing devices at time instant t, and $g_{0_{(r)}}^{(t)\prime\prime}$ represents an accumulated value of amplified gradient values of the r computing devices at time instant t, i.e., the third set of gradient values. Therefore, the computing device 104 sends the third set of gradient values $g_{0_{(r)}}^{(t)\prime\prime}$ and the second shared factor $\exp_0^{(t)}$ to the computing device 102.

In some embodiments, the computing device 104 receives not only the second set of gradient values and the first shared factor from the first computing device 102, but also the second bias value and the first bias value factor related to the second set of gradient values.

In some embodiments, the computing device receives simultaneously the second set of gradient values $g_r^{(t)\prime\prime}$, the first shared factor $\exp_r^{(t)}$, the second bias value bias_factor$_r^{(t)}$, and the first bias value factor bias_exp$_r^{(t)}$.

The computing device 104 also needs to determine a third bias value and a second bias value factor related to the data block having been stored in the second computing device 104.

The computing device 104 may further obtain, based on the identification of the data block related to the second bias value and the first bias value factor received, the third bias value and the second bias value factor generated at the computing device 104. The third bias value and the second bias value factor correspond to the accumulated gradient value stored at the computing device 104.

Thereafter, the computing device 104 determines a fourth bias value and a third bias value factor for the fourth bias value, based on the second bias value, the first bias value factor, the third bias value and the second bias value factor.

The computing device 104 determines a second difference between the second bias value factor and the first bias value factor through the following formula: $\Delta \text{bias\_exp}^{(t)} = \text{bias\_exp}_0^{(t)} - \text{bias\_exp}_r^{(t)}$, where $\text{bias\_exp}_0^{(t)}$ represents an exponent value of the current shared bias value at time instant t, i.e., the second bias value factor; $\text{bias\_exp}_r^{(t)}$ represents an exponent of the shared bias value of the $r^{th}$ computing device at time instant t, i.e., the first bias value factor; and $\Delta \text{bias\_exp}^{(t)}$ represents a difference between the exponent of the shared bias value and the exponent value of the current bias value of the $r^{th}$ computing device at time instant t, i.e., the second difference.

If the second difference is greater than or equal to a fourth threshold, the second computing device 104 determines the first bias value factor as the third bias value factor. In one example, the fourth threshold is 0. If $\Delta \text{bias\_exp}^{(t)} \geq 0$, $\text{bias\_exp}_0^{(t)} = \text{bias\_exp}_r^{(t)}$.

Next, the computing device 104 adjusts the third bias value based on the second difference. The computing device 104 further determines the fourth bias value based on the adjusted third bias value and the second bias value. The computing device 104 computes the fourth bias value through the following formula (16):

$$\text{bias\_factor}_{0_{(r)}}^{(t)} = \frac{\text{bias\_factor}_{0_{(r-1)}}^{(t)}}{2^{\Delta \text{bias\_exp}^{(t)}}} + \text{bias\_factor}_r^{(t)} \quad (16)$$

where $\text{bias\_factor}_{0_{(r-1)}}^{(t)}$ represents an accumulation sum of integers obtained by applying the decimal parts of the preceding (r−1) shared bias values at time instant t, i.e., the third bias value; and $\text{bias\_factor}_{0_{(r)}}^{(t)}$ represents an integer obtained by applying the decimal parts of the r shared bias values at time instant t, i.e., the fourth bias value.

If the second difference is less than the fourth threshold, the second bias value factor is determined as the third bias value factor. Then, the computing device 104 adjusts the second bias value based on the difference, and determines the fourth bias value based on the adjusted second bias value and the third bias value.

The computing device 104 determines the fourth bias value through the following formula (17):

$$\text{bias\_factor}_{0_{(r)}}^{(t)} = \text{bias\_factor}_{0_{(r-1)}}^{(t)} + \text{bias\_factor}_{r}^{(t)} * 2^{\Delta bias\_exp^{(t)}} \quad (17)$$

where $\text{bias\_factor}_{0_{(r-1)}}^{(t)}$ represents an accumulation sum of integers after amplifying the decimal parts of the (r−1) shared bias values at time instant t, i.e., the third bias value; and $\text{bias\_factor}_{0_{(r)}}^{(t)}$ represents an integer obtained by amplifying the decimal parts of the r shared bias values at time instant t, i.e., the fourth bias value.

The computing device 104 sends the fourth bias value $\text{bias\_factor}_{0_{(r)}}^{(t)}$ and the third bias value factor $\text{bias\_exp}_0^{(t)}$ to the first computing device.

In this way, processing of a shared bias value can be implemented. Due to the presence of the bias value, accuracy of data is improved greatly.

After the computing device 104 has completed processing and returned the data to the computing device 102, the computing device 102 receives the third set of gradient values $g_{0_{(r)}}^{(t)''}$ and the second shared factor $\exp_0^{(t)}$, where the third set of gradient values and the second shared factor have the second data format.

The computing device 102 receives the third set of gradient values $g_{0_{(r)}}^{(t)''}$ and the second shared factor $\exp_0^{(t)}$. Subsequently, the computing device 102 scales the third set of gradient values based on the second shared factor, and the scaled third set of gradient values has the first data format.

The computing device 102 generates the scaling factor using the second shared factor through the following formula (18):

$$E_g^{(t)} = \frac{\left(MAX_{INT16} * \left(2^{\exp_0^{(t)}}\right)\right)}{size} \quad (18)$$

where $E_g^{(t)}$ represents an amplifying multiple of a gradient sum at time instant t, and size represents a total number of computing devices. Then, the computing device 102 scales the third set of gradient values through the following formula (19):

$$g^{(t)'} = \text{float}\left(\frac{g_0^{(t)''}}{E_g^{(t)}}\right) \quad (19)$$

where $g^{(t)'}$ represents a gradient sum of all of the computing devices. Thereafter, the computing device 102 adjusts parameters of the machine learning model using the third set of gradient values scaled.

The computing device 102 adjusts parameters of the machine learning model through the following formula (20):

$$w^{(t+1)} = w^{(t)} - \eta g^{(t)'} \quad (20)$$

where $w^{(t)}$ represents all parameter values at time instant t, η represents a learning rate, and $w^{(t+1)}$ represents all parameter values at time instant t+1.

In some embodiments, the computing device 102 further receives from the computing device 104 the fourth bias value $\text{bias\_factor}_{0_{(r)}}^{(t)}$ and the third bias value factor $\text{bias\_exp}_0^{(t)}$.

The computing device 102 scales the fourth bias value based on the third bias value factor, where the scaled fourth bias value has the first data format, and biases the third set of gradient values scaled, using the scaled fourth bias value. The process is implemented through the following formulae (21) and (22):

$$E_{bias}^{(t)} = \frac{\left(MAX_{INT16} * \left(2^{bias\_exp_0^{(t)}}\right)\right)}{size} \quad (21)$$

where $E_{bias}^{(t)}$ represents an amplifying multiple of the shared bias value at time instant t, and the size represents a total number of processing devices; and then, the gradient values are computed through the following formula:

$$g^{(t)'} = \text{float}\left(\frac{g_0^{(t)''}}{E_g^{(t)}}\right) - \text{float}\left(\frac{\text{bias\_factor}_0^{(t)}}{E_{bias}^{(t)}}\right) \quad (22)$$

where $g^{(t)'}$ represents a gradient sum of all of the computing devices. Subsequently, the computing device 102 adjusts parameters of the machine learning model using the third set of gradient values biased.

Figure 6:
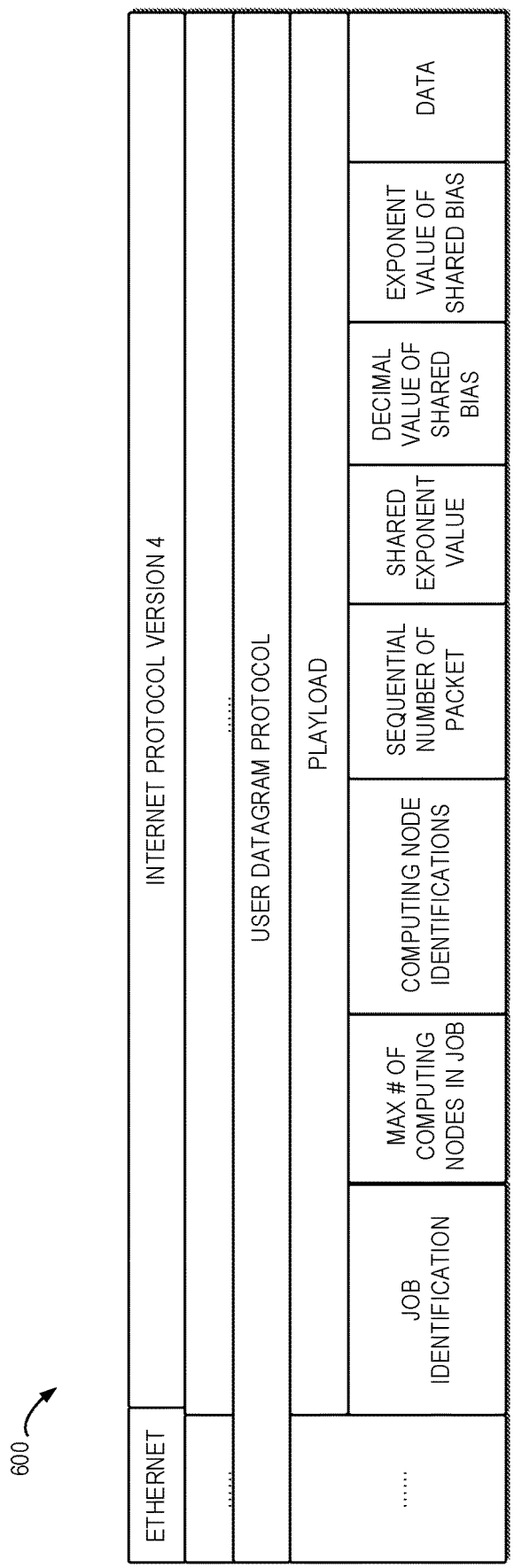
FIG. 6 illustrates a schematic diagram of a packet structure according to embodiments of the present disclosure.

Processing of the gradient values has been described above, and reference will be made below to FIG. 6 which illustrates a packet 600 for sending data according to embodiments of the present disclosure. A specific field is provided in the packets sent by the computing device 102 and the computing device 104. As shown in FIG. 6, the payload of the data packet is additionally provided with a job identification, a maximum number of computing nodes in the job, identifications of the computing nodes, a sequential number of the packet, a shared exponent value, a decimal value of a shared bias, a shared bias exponent value, and data.

The job identification is provided for identifying a running job or machine learning model. The maximum number of computing nodes in the job identifies a number of computing devices or nodes running the machine learning model. The identifications of the computing nodes are provided for identifying computing devices or nodes running the machine leaning model. The sequential number of the packet is used for describing a sequence of the packet. The shared exponent value is a shared exponent for a set of gradient values. The decimal value of a shared bias is the decimal part of the shared bias, i.e., the scaled bias value. The shared bias exponent value is an exponent of a shared bias value. Data refer to processed gradient values.

Composition of the transmitted data packet has been discussed above with reference to FIG. 6. Hereinafter, reference will be made to FIG. 7 to describe a flowchart of a process 700 of initializing device connections according to embodiments of the present disclosure.

A computing device 702 and a computing device 704 are initialized before exchanging gradient values with a programmable switch 706. Then, the computing device 702 and the computing device 704 send an initialization request to the programmable switch 706, respectively. If transmission succeeds, upon receiving the initialization requests from the computing device 702 and the computing device 704, the programmable switch will broadcast a result to both devices. If transmitting 712 the initialization request from the computing device 702 to the programmable switch 706 fails, the computing device 702 will wait for a predetermined period of time and then continue to send 714 the initialization request to the programmable switch 706. If transmission succeeds, the programmable switch 706 broadcasts 716 the result to the computing device 702. If transmission fails, the computing device 702 will wait for a predetermined period of time and then continue to send 718 the initialization request to the programmable switch 706. Since the programmable switch 706 has generated the broadcast result for the initialization request, it indicates that only the computing device 702 has not received the result yet. Therefore, it is only required to unicast 720 the result to the computing device 702.

The above example is provided merely for describing the present disclosure, without suggesting any specific limitation thereto. The number of computing devices connected to the programmable switch 706 may be set as required.

Figure 7:
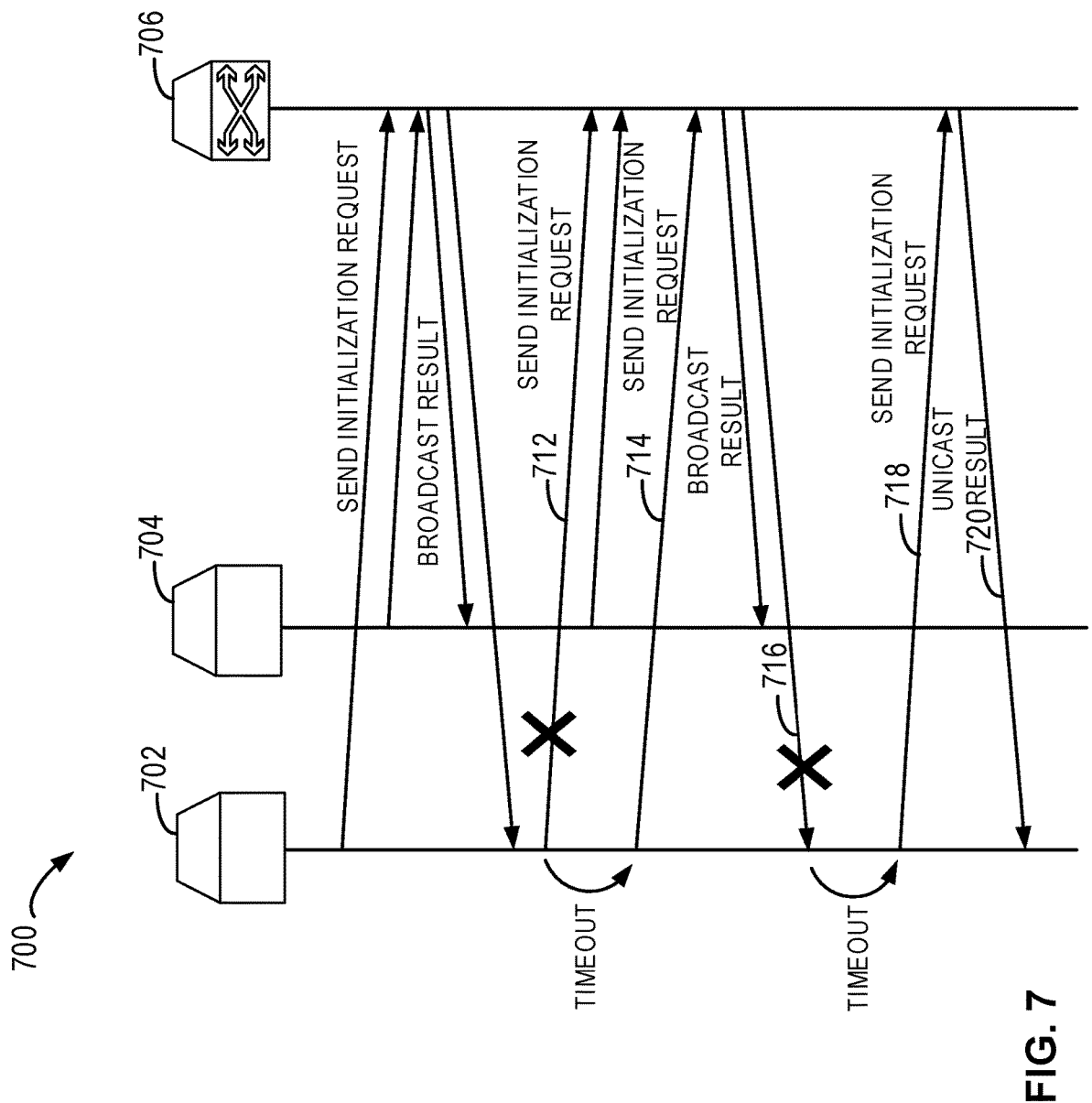
FIG. 7 illustrates a flowchart of a process of initializing device connections according to embodiments of the present disclosure.
Figure 8:
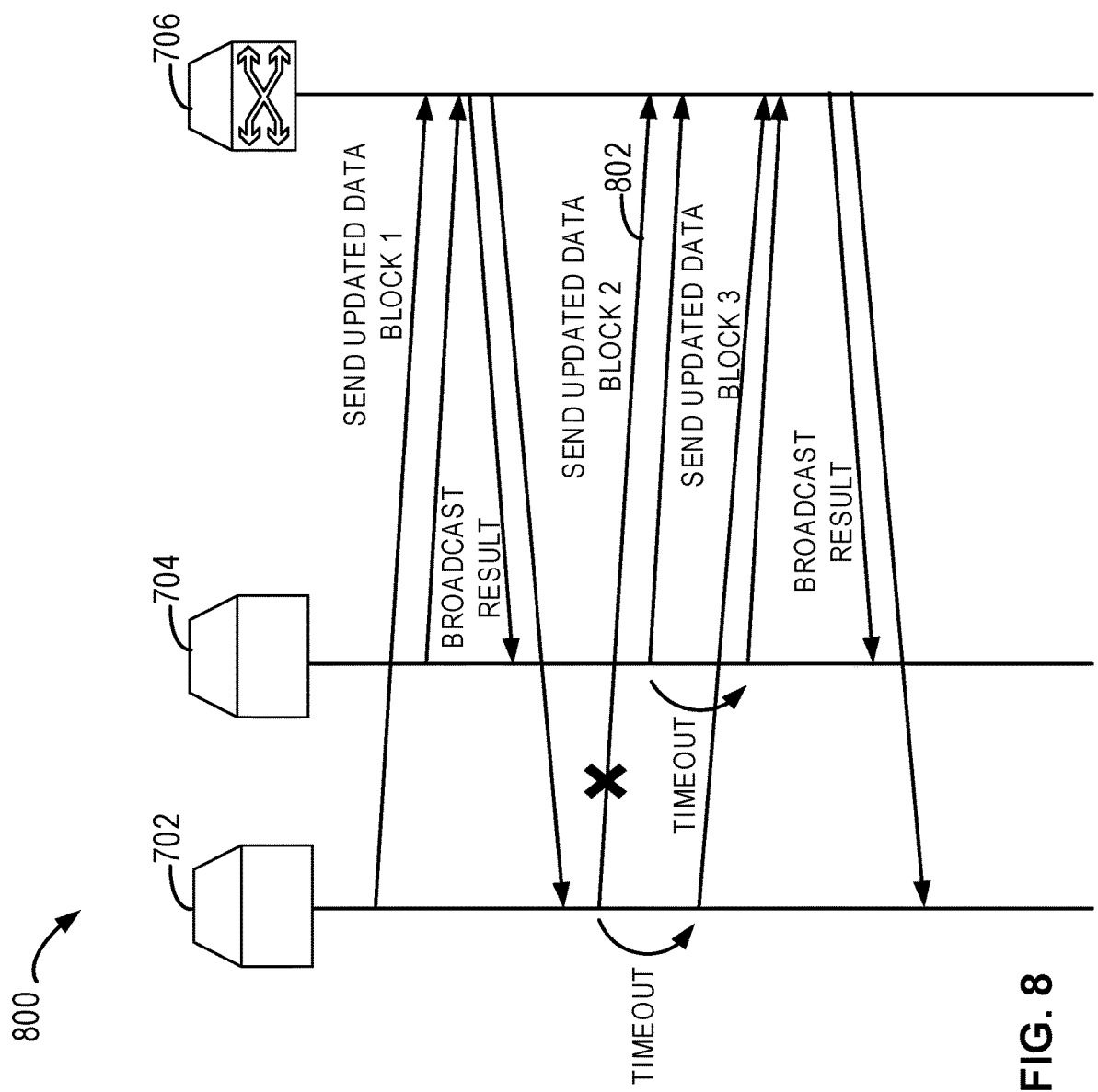
FIG. 8 illustrates a flowchart of a process of sending data according to embodiments of the present disclosure.

The initialization process of data transmission has been discussed above in combination with FIG. 7. Hereinafter, reference will be made to FIG. 8 to describe a process 800 of sending data according to embodiments of the present disclosure. FIG. 8 illustrates a solution when sending data from a computing device to the programmable switch 706 fails.

When the computing device 702 and the computing device 704 send an updated data block 1 to the programmable switch 706, the programmable switch 706 receives the updated data block 1 from the computing device 702 and the computing device 704 and broadcasts a result thereto. If sending 802 an updated data block 2 from the computing device 702 to the programmable switch 706 fails, the programmable switch 706 may not broadcast the result to the computing device 702 and the computing device 704, causing timeout for both of the computing devices. At this time, the two devices will resend the updated data block 2 until the broadcast result is received. The above example is provided merely for describing the present disclosure, without suggesting any limitation thereto. The number of computing devices connected to the programmable switch 706 may be set as required.

The flowchart of the process 800 of sending data according to embodiments of the present disclosure has been explained above in combination with FIG. 8. Hereinafter, reference will be made to FIG. 9 to describe a process 900 of sending data according to embodiments of the present disclosure. The process 900 is provided for describing a solution when sending the result by the programmable switch 706 fails.

The computing device 702 and the computing device 704 successfully receive the result after sending the updated data block 1 to the programmable switch 706. When the computing device 702 and the computing device 704 send the updated data block 2 to the programmable switch 706, the computing device 702 does not receive 902 the broadcast result. After waiting timeout, the computing device 702 will again send 904 the updated data block 2 to the programmable switch 706. Since the programmable switch 706 has broadcast the result to the computing devices, the programmable switch 706 unicasts 906 the result to the computing device 702. If the computing device 702 receives the result successfully, the updated data block 2 will not be sent any longer. If the receiving is not successful, the computing device 702 will continue to send 908 the updated data block 2 until the result is unicasted 910 successfully.

The above example is provided merely for describing the present disclosure, without suggesting any specific limitation thereto. The number of computing devices connected to the programmable switch 706 may be set as required.

Figure 9:
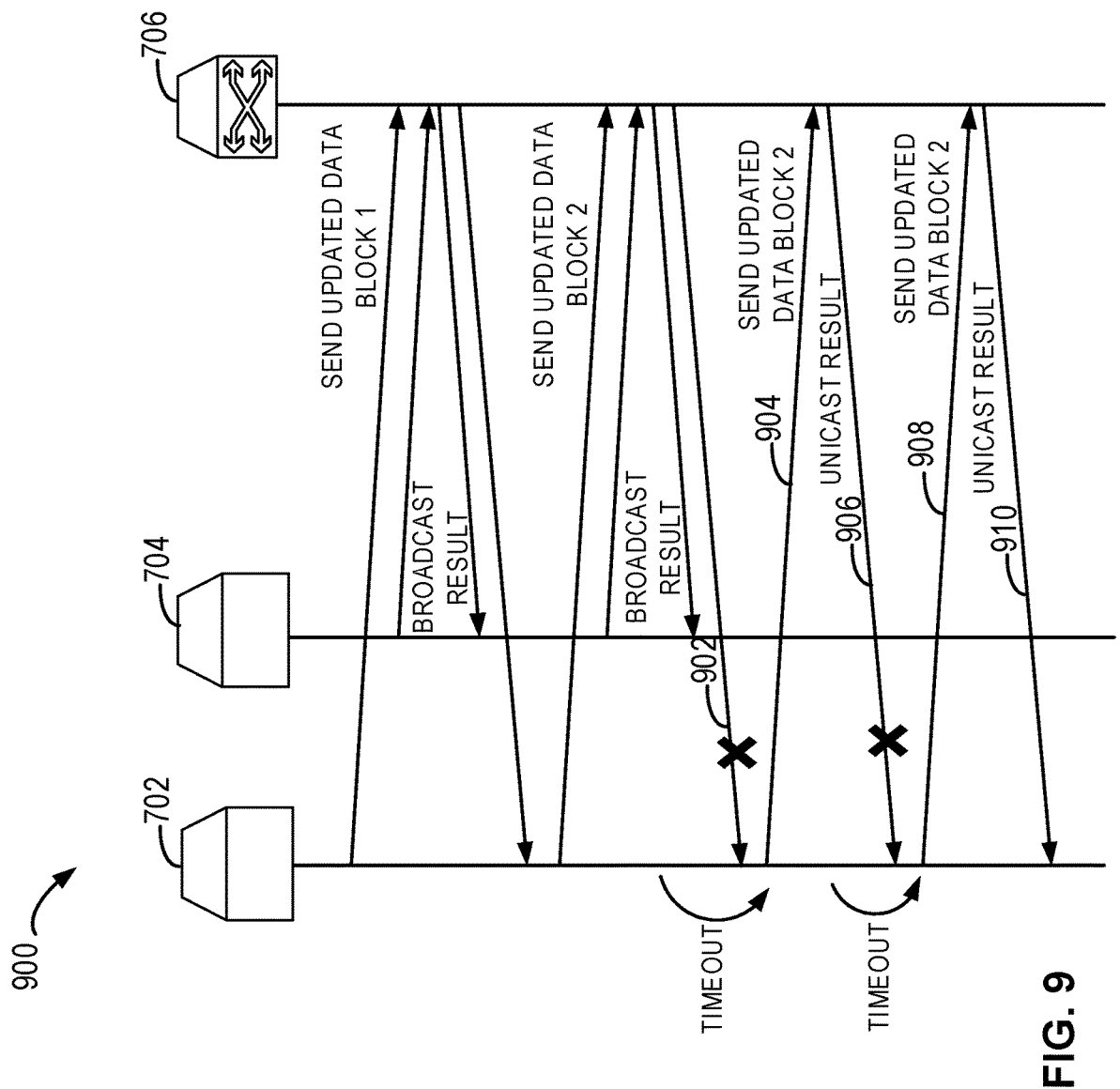
FIG. 9 illustrates a flowchart of a process of sending data according to embodiments of the present disclosure.
Figure 10:
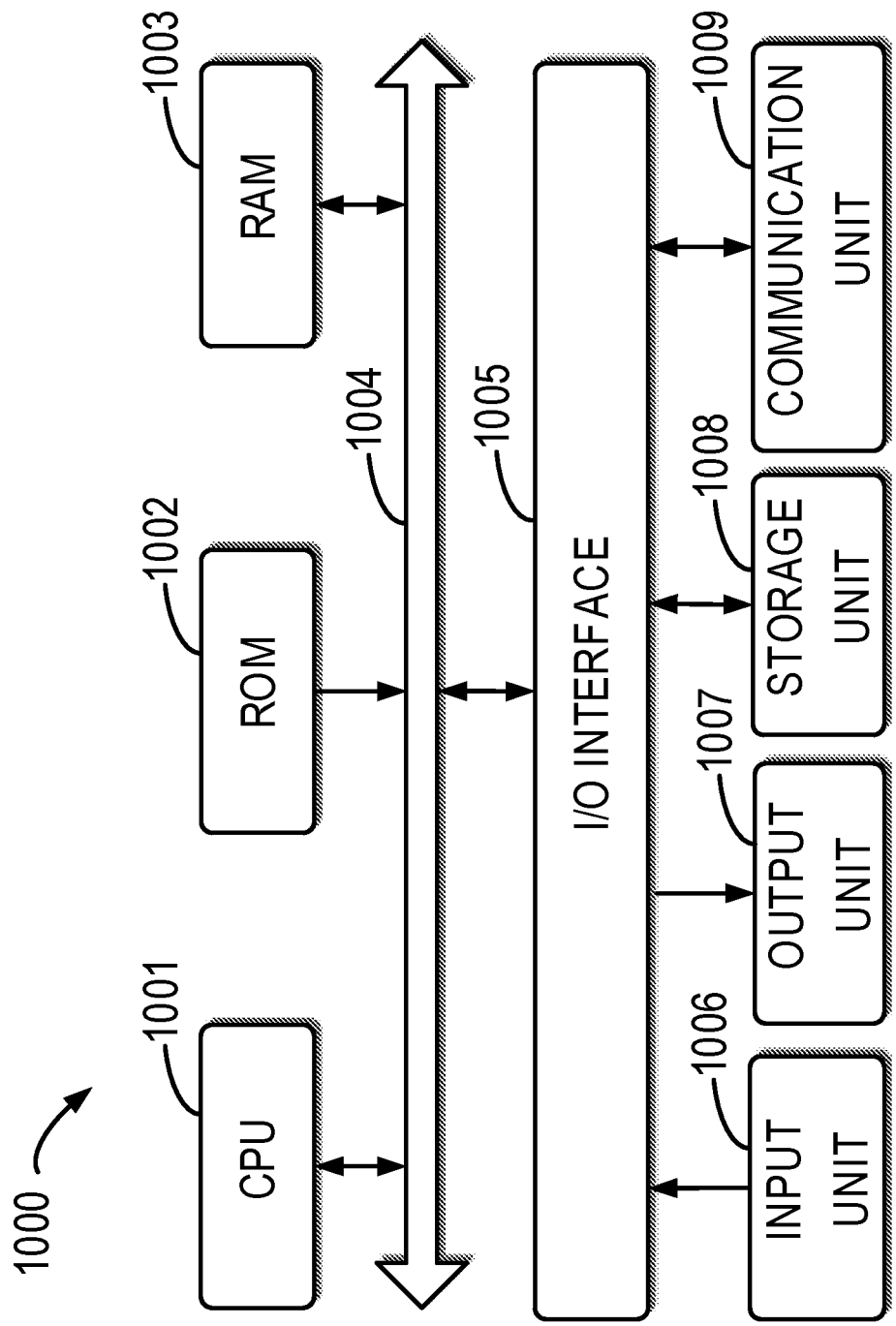
FIG. 10 illustrates a schematic block diagram of an example device adapted to implement embodiments of the present disclosure.

FIG. 10 illustrates a block diagram of an example device 1000 that can be used to implement embodiments of the present disclosure. For example, any of the computing devices 102, 104 as shown in FIG. 1, and the computing devices 702, 704 and the programmable switch 706 as shown in FIGS. 7-9 may be implemented by the device 1000. As shown, the device 1000 includes a central processing unit (CPU) 1001 which performs various appropriate acts and processing, based on a computer program instruction stored in a read-only memory (ROM) 1002 or a computer program instruction loaded from a storage unit 1008 to a random access memory (RAM) 1003. The RAM 1003 stores therein various programs and data required for operations of the device 1000. The CPU 1001, the ROM 1002 and the RAM 1003 are connected via a bus 1004 with one another. An input/output (I/O) interface 1005 is also connected to the bus 1004.

The following components in the device 1000 are connected to the I/O interface 1005: an input unit 1006 such as a keyboard, a mouse and the like; an output unit 1007 including various kinds of displays and loudspeakers, etc.; a storage unit 1008, such as a magnetic disk, an optical disk, and etc.; and a communication unit 1009, such as a network card, a modem, and a wireless communication transceiver, etc. The communication unit 1009 allows the device 1000 to exchange information/data with other devices through a computer network such as the Internet and/or various kinds of telecommunications networks.

Various processes and processing as described above, e.g., the methods 200 and 500 may be executed by the processing unit 1001. For example, in some embodiments, the methods 200 and 500 may be implemented as a computer software program that is tangibly included in a machine readable medium, e.g., the storage unit 1008. In some embodiments, part or all of the computer program may be loaded and/or mounted onto the device 1000 via ROM 1002 and/or communication unit 1009. When the computer program is loaded to the RAM 1003 and executed by the CPU 1001, one or more acts of the methods 200 and 500 as described above may be executed.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electrical storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical fibers transmission, wireless transmission, routers, firewalls, switches, gateway computers and/or edge servers. A network adapter card or network interface in each computing/processing device receives computer readable program instructions from the network and forwards the computer readable program instructions for storage in computer readable storage media within the respective computing/processing devices.

Computer program instructions for carrying out operations of the present disclosure may be assembly instructions, instruction-set-architecture (ISA) instructions, machine instructions, machine dependent instructions, microcode, firmware instructions, state-setting data, or either source codes or object codes written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the scenario that involves a remote computer, the remote computer may be connected to the user's computer through any type of network, including a local area network (LAN) or a wide area network (WAN), or the connection may be made to an external computer (for example, through the Internet using an Internet Service Provider). In some embodiments, an electronic circuitry such as a programmable logic circuitry, a field-programmable gate array (FPGA), or a programmable logic array (PLA) is personalized by utilizing state information of the computer readable program instructions, the electronic circuitry may execute the computer readable program instructions, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing apparatus to produce a machine, such that the instructions, when executed via the processing unit of the computer or other programmable data processing apparatus, create means for implementing the functions/acts specified in the flowchart and/or block diagram block or blocks. These computer readable program instructions may also be stored in a computer readable storage medium which cause a computer, a programmable data processing apparatus, and/or other devices to function in a particular manner, such that the computer readable storage medium having instructions stored therein includes an article of manufacture including instructions which implement aspects of the functions/acts specified in the flowchart and/or block diagram block or blocks.

The computer readable program instructions may also be loaded onto a computer, other programmable data processing apparatuses, or other devices to cause a series of operational steps to be performed on the computer, other programmable data processing apparatuses or other devices to produce a computer implemented process, such that the instructions which are executed on the computer, other programmable data processing apparatuses, or other devices implement the functions/acts specified in the flowchart and/or block diagram block or blocks.

The flowcharts and block diagrams in the attached drawings illustrate the architecture, functionality, and operation of possible implementations of systems, methods and computer program products according to various embodiments of the present disclosure. In this regard, each block in the flowchart or block diagram may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented above for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application thereof or technical improvement over technologies available in the marketplace, or to enable others of ordinary skill in the art to understand the embodiments disclosed herein.

What is claimed is:

1. A data processing method, comprising:
  generating, at a first computing device, a first set of gradient values associated with a data block processed by nodes of a machine learning model, the first set of gradient values being in a first data format;
  determining a first shared factor from the first set of gradient values, the first shared factor being in a second data format of a lower precision than that of the first data format;
  scaling the first set of gradient values with the first shared factor, to obtain a second set of gradient values having the second data format;
  sending the second set of gradient values and the first shared factor to a second computing device; and
  in response to receiving a third set of gradient values and a second shared factor from the second computing device, adjusting the third set of gradient values utilizing the second shared factor, converting the adjusted third set of gradient values into a third data format of a higher precision than that of the second data format and adjusting parameters of the machine learning model based in part on the converted third set of gradient values;

wherein the method further comprises:
    determining, based on a first bias value related to the first set of gradient values based on a minimum value in the first set of gradient values, the first bias value being in the first data format, a first bias value factor in the second data format;
    scaling, based on the first bias value factor, the first bias value to obtain a second bias value represented in the second data format;
    sending the first bias value factor and the second bias value to the second computing device; and
    receiving, from the second computing device, a second bias value factor and a third bias value for adjusting the third set of gradient values; and
    wherein the second computing device comprises a programmable switch connected to the first computing device via a network.

2. The method of claim 1, wherein determining the first shared factor from the first set of gradient values comprises:
    determining a maximum value and a minimum value of the first set of gradient values; and
    determining the first shared factor based on the maximum value and the minimum value.

3. The method of claim 1,
wherein scaling the first set of gradient values comprises:
    adjusting the first set of gradient values with the first bias value; and
    scaling the first set of adjusted gradient values with the first shared factor, to generate the second set of gradient values.

4. The method of claim 1, wherein the third set of gradient values and the second shared factor are in the second data format, and wherein adjusting the parameters of the machine learning model comprises:
    scaling the third set of gradient values based on the second shared factor, the third set of scaled gradient values being in the first data format; and
    adjusting the parameters of the machine learning model with the third set of scaled gradient values.

5. The method of claim 4, wherein adjusting the parameters of the machine learning model further comprises:
    receiving a fourth bias value and a third bias value factor from the second computing device;
    scaling the fourth bias value based on the third bias value factor, the scaled fourth bias value being in the first data format, and
    wherein adjusting parameters of the machine learning model using the third set of scaled gradient values comprises:
        biasing the third set of scaled gradient values using the scaled fourth bias value; and
        adjusting the parameters of the machine learning model with the third set of biased gradient values.

6. A computer program product being stored tangibly on a non-volatile computer readable medium and comprising machine executable instructions which, when executed, cause a machine to perform steps of the method of claim 1.

7. An electronic device, comprising:
a processor; and
a memory storing computer program instructions, the computer program instructions in the memory being executed by the processor to control the electronic device to perform acts comprising:
    generating a first set of gradient values associated with a data block processed by nodes of a machine learning model, the first set of gradient values being in a first data format;
    determining a first shared factor from the first set of gradient values, the first shared factor being in a second data format of a lower precision than that of the first data format;
    scaling the first set of gradient values with the first shared factor, to obtain a second set of gradient values having the second data format;
    sending the second set of gradient values and the first shared factor to a computing device; and
    in response to receiving a third set of gradient values and a second shared factor from the computing device, adjusting the third set of gradient values utilizing the second shared factor, converting the adjusted third set of gradient values into a third data format of a higher precision than that of the second data format and adjusting parameters of the machine learning model based in part on the converted third set of gradient values;

wherein the acts further comprise:
    determining, based on a first bias value related to the first set of gradient values based on a minimum value in the first set of gradient values, the first bias value being in the first data format, a first bias value factor in the second data format;
    scaling, based on the first bias value factor, the first bias value to obtain a second bias value represented in the second data format;
    sending the first bias value factor and the second bias value to the second computing device; and
    receiving, from the second computing device, a second bias value factor and a third bias value for adjusting the third set of gradient values; and
    wherein the computing device comprises a programmable switch connected to the electronic device via a network.

8. The electronic device of claim 7, wherein scaling the first set of gradient values comprises:
    adjusting the first set of gradient values with the first bias value; and
    scaling the first set of adjusted gradient values with the first shared factor, to generate the second set of gradient values.

9. The electronic device of claim 7, wherein the third set of gradient values and the second shared factor are in the second data format, and wherein adjusting the parameters of the machine learning model comprises:
    scaling the third set of gradient values based on the second shared factor, the third set of scaled gradient values being in the first data format; and
    adjusting the parameters of the machine learning model with the third set of scaled gradient values.

10. The electronic device of claim 9, wherein adjusting the parameters of the machine learning model further comprises:
    receiving a fourth bias value and a third bias value factor from the second computing device;

scaling the fourth bias value based on the third bias value factor, the scaled fourth bias value being in the first data format, and wherein adjusting parameters of the machine learning model using the third set of scaled gradient values comprises:

biasing the third set of scaled gradient values using the scaled fourth bias value; and adjusting the parameters of the machine learning model with the third set of biased gradient values.

11. A data processing method, comprising:

receiving, at a second computing device, a second set of gradient values and a first shared factor from a first computing device, the second set of gradient values being obtained by scaling a first set of gradient values with the first shared factor, the first set of gradient values being in a first data format and associated with a data block processed by nodes of a machine learning model, the first shared factor being in a second data format of a lower precision than that of the first data format;

obtaining a fourth set of gradient values of a third device for the data block and a third shared factor related to the fourth set of gradient values, the machine learning model being running by the third device;

determining a third set of gradient values and a second shared factor for the third set of gradient values based on the first shared factor, the second set of gradient values, the fourth set of gradient values, and the third shared factor; and sending, to the first computing device, the third set of gradient values and the second shared factor for adjusting the third set of gradient values utilizing the second shared factor, converting the adjusted third set of gradient values into a third data format of a higher precision than that of the second data format and adjusting parameters of the machine learning model based in part on the converted third set of gradient values;

wherein the method further comprises:

receiving a first bias value factor and a second bias value that are related to the second set of gradient values;

determining a second bias value factor and a third bias value that are related to the data block in the second computing device;

determining a fourth bias value and a third bias value factor for the fourth bias value based on the first bias value factor, the second bias value, the third bias value, and the second bias value factor; and sending the fourth bias value and the third bias value factor to the first computing device; and wherein the second computing device comprises a programmable switch connected to the first computing device via a network.

12. The method of claim 11, wherein determining the third set of gradient values and the second shared factor for the third set of gradient values comprises:

determining a first difference between the third shared factor and the first shared factor; and in response to the first difference being equal to or greater than a third threshold, determining the first shared factor as the second shared factor;

adjusting the fourth set of gradient values based on the first difference; and determining the third set of gradient values based on the second set of gradient values and the fourth set of gradient values.

13. The method of claim 12, wherein determining the third set of gradient values and the second shared factor for the third set of gradient values further comprises:

in response to the first difference being less than the third threshold, determining the third shared factor as the second shared factor;

adjusting the second set of gradient values based on the first difference; and determining the third set of gradient values based on the second set of adjusted gradient values and the fourth set of gradient values.

14. The method of claim 11, wherein determining the fourth bias value and the third bias value factor for the fourth bias value comprises:

determining a second difference between the second bias value factor and the first bias value factor; and in response to the second difference being equal to or greater than a fourth threshold, determining the first bias value factor as the third bias value factor;

adjusting the third bias value based on the second difference; and determining the fourth bias value based on the adjusted third bias value and the second bias value.

15. The method of claim 14, wherein determining the fourth bias value and the third bias value factor for the fourth bias value further comprises:

in response to the second difference being less than the fourth threshold, determining the second bias value factor as the third bias value factor;

adjusting the second bias value based on the second difference; and determining the fourth bias value based on the adjusted second bias value and the third bias value.

16. A computer program product being stored tangibly on a non-volatile computer readable medium and comprising machine executable instructions which, when executed, cause a machine to perform steps of the method of claim 11.

17. An electronic device, comprising a processor and a memory storing computer program instructions, the computer program instructions in the memory being executed by the processor to control the electronic device to perform steps of the method of claim 11.

18. The electronic device of claim 17, wherein determining the third set of gradient values and a second shared factor for the third set of gradient values comprises:

determining a first difference between the third shared factor and the first shared factor; and in response to the first difference being equal to or greater than a third threshold, determining the first shared factor as the second shared factor;

adjusting the fourth set of gradient values based on the first difference; and determining the third set of gradient values based on the second set of gradient values and the fourth set of gradient values.

19. The electronic device of claim 18, wherein determining the third set of gradient values and a second shared factor for the third set of gradient values further comprises:

in response to the first difference being less than the third threshold, determining the third shared factor as the second shared factor;

adjusting the second set of gradient values based on the first difference; and determining the third set of gradient values based on the second set of adjusted gradient values and the fourth set of gradient values.

20. The electronic device of claim 17, wherein the method further comprises:

receiving a first bias value factor and a second bias value that are related to the second set of gradient values;

determining a second bias value factor and a third bias value that are related to the data block in the second computing device;

determining a fourth bias value and a third bias value factor for the fourth bias value based on the first bias value factor, the second bias value, the third bias value and the second bias value factor; and sending the fourth bias value and the third bias value factor to the first computing device.

* * * * *